US010666440B2

(12) United States Patent
Ren

(10) Patent No.: US 10,666,440 B2
(45) Date of Patent: May 26, 2020

(54) AUTHENTICATION METHOD, DEVICE, SERVER, AND SYSTEM, AND STORAGE MEDIUM

(71) Applicant: Tencent Technology (Shenzhen) Company Limited, Shenzhen (CN)

(72) Inventor: Jie Ren, Shenzhen (CN)

(73) Assignee: Tencent Technology (Shenzhen) Company Limited, Shenzhen, Guangdong Province (CN)

( * ) Notice: Subject to any disclaimer, the term of this patent is extended or adjusted under 35 U.S.C. 154(b) by 177 days.

(21) Appl. No.: 15/707,783

(22) Filed: Sep. 18, 2017

(65) Prior Publication Data

US 2018/0006818 A1 Jan. 4, 2018

Related U.S. Application Data

(63) Continuation-in-part of application No. PCT/CN2016/084205, filed on May 31, 2016.

(30) Foreign Application Priority Data

Oct. 28, 2015 (CN) .......................... 2015 1 0711862

(51) Int. Cl.
*H04L 29/06* (2006.01)
*H04L 9/32* (2006.01)
(Continued)

(52) U.S. Cl.
CPC ............ *H04L 9/3213* (2013.01); *G06F 21/33* (2013.01); *H04L 29/06* (2013.01);
(Continued)

(58) Field of Classification Search
CPC .............. H04L 9/3213; H04L 63/0807; H04L 63/0884; G06F 21/41
See application file for complete search history.

(56) References Cited

U.S. PATENT DOCUMENTS 6,360,254 B1 * 3/2002 Linden .................... G06F 21/31
709/219
9,323,916 B1 * 4/2016 Wu .......................... G06F 21/44
(Continued)

FOREIGN PATENT DOCUMENTS

| CN | 104506492 A | 4/2015 |
|---|---|---|
| CN | 104994073 A | 10/2015 |
| CN | 105245541 A | 1/2016 |

OTHER PUBLICATIONS

Tencent Technology, ISRWO, PCT/CN2016/084205, dated Jul. 21, 2016, 9 pges.

(Continued)

*Primary Examiner* — David J Pearson
(74) *Attorney, Agent, or Firm* — Morgan, Lewis & Bockius LLP

(57) ABSTRACT

The present disclosure discloses an authentication method performed at a server, including: generating, based on a first account that is possessed by a user of a first device and that corresponds to a first application, corresponding token information; sending the token information to the first device to be shared by the first device with devices in a device group in a replication restriction manner; performing, based on the token information, authentication on a second device that is in the device group; granting permission of accessing the first account to the second device when the authentication succeeds; and triggering the first device to switch from a state of first account-based login to the first application to a state of suspending the login to the first application when it is determined that the second device logs in to the first application based on the permission of accessing the first account.

20 Claims, 7 Drawing Sheets

(51) Int. Cl.
*G06F 21/33* (2013.01)
*G06F 21/40* (2013.01)

(52) U.S. Cl.
CPC ...... *H04L 63/0807* (2013.01); *H04L 63/0853* (2013.01); *H04L 63/104* (2013.01); *G06F 21/40* (2013.01); *G06F 2221/2137* (2013.01); *H04L 63/0884* (2013.01)

(56) References Cited

U.S. PATENT DOCUMENTS

| | | |
|---|---|---|
| 10,033,719 B1* | 7/2018 | Baranowski ........ H04L 63/0823 |
| 2006/0095788 A1 | 5/2006 | Bronstein et al. |
| 2014/0122730 A1* | 5/2014 | Burch .................. H04L 67/146 |
| | | 709/228 |
| 2015/0106517 A1* | 4/2015 | Saunders ........... H04L 63/0428 |
| | | 709/225 |

OTHER PUBLICATIONS

Tencent Technology, IPRP, PCT/CN2016/084205, dated May 1, 2018, 8 pges.

\* cited by examiner

AUTHENTICATION METHOD, DEVICE, SERVER, AND SYSTEM, AND STORAGE MEDIUM

RELATED APPLICATIONS

This application is a continuation-in-part application of PCT/CN2016/084205, entitled "AUTHENTICATION METHOD, DEVICE, SERVER, SYSTEM AND STORAGE MEDIUM" filed on May 31, 2016, which claims priority to Chinese Patent Application No. 201510711862.X, filed with the State Intellectual Property Office of the People's Republic of China on Oct. 28, 2015, and entitled "AUTHENTICATION METHOD, DEVICE, AND SYSTEM", both of which are incorporated herein by reference in their entirety.

FIELD OF THE TECHNOLOGY

The present disclosure relates to security control technologies in the communications field, and in particular, to an authentication method, device, server, and system, and a storage medium.

BACKGROUND OF THE DISCLOSURE

With the intelligence of devices, in addition to conventional devices such as desktop computers and notebook computers, people further have intelligent devices of multiple forms such as smartphones, tablet computers, smart glasses, and smartwatches. These devices all have strong intelligence and can run multiple different applications. For example, these devices can run applications to provide services of multiple forms, including online services (for example, online multimedia playback, online banking, and social services such as WeChat and MicroBlog), and further including offline services (an online housekeeping reservation service and online purchase of products with a home delivery service, for example, a take-out service, a housekeeping service, electronic products, or apparel).

A user needs to log in, by using a pre-registered account and a key, to an application running in a device, so as to use a service provided by the application. At present, there is a potential security threat to the management of accounts.

In a typical scenario, a user 1 usually has multiple terminal devices such as a smartphone, a tablet computer, or the like, and the user usually uses the same service by using the possessed devices. For example, the user 1 may use WeChat by separately using the smartphone and the tablet computer at different times. In this case, the user 1 needs to separately set and store an account and a key of WeChat in the possessed devices. Usually, the user 1 may only carry the smartphone around but not carry a device such as the tablet computer or a notebook computer. This brings a potential security threat to the account of the user 1. Consequently, a malicious user 2 may log in, by using the device of the user 1, to the application to use the service, causing a loss to the user 1.

In another typical scenario, a user 1 wants to temporarily alienate an account (for example, a Taobao account) of the user 1 to a user 3 for use, and the user 1 needs to notify the user 3 of the account and a key of the user 1 in a particular manner (for example, the user 1 notifies the user 3 in a verbal manner or by sending, by using a device possessed by the user 1, information to a device possessed by the user 3). This brings a great potential security threat to the account of the user 1.

In conclusion, in the related technology, there is no effective solution to avoid the key exposure of an account to effectively ensure the account security when multiple devices use the same account.

SUMMARY

Embodiments of the present application provide an authentication method, device, server, and system, and a non-transitory computer readable storage medium, so as to avoid the key exposure of an account when multiple devices log in to an application by using the same account, so as to ensure the account security.

According to a first aspect, an embodiment of the present application provides an authentication method performed at a server having one or more processors and memory storing one or more programs to be executed by the one or more processors, the method comprising:

generating, based on a first account that is possessed by a user of a first device and that corresponds to a first application, token information corresponding to the first account, the token information representing that the user of the first device has the ownership of the first account;

sending the token information to the first device, the token information being shared by the first device with devices in a device group in a replication restriction manner;

performing, based on the token information, authentication on a second device that is in the device group and that has the token information;

granting permission of accessing the first account to the second device when the authentication succeeds, to support the second device to log in to the first application by using the first account; and triggering the first device to switch from a state of first account-based login to the first application to a state of suspending the login to the first application by using the first account when it is determined that the second device logs in to the first application based on the permission of accessing the first account.

According to a second aspect, an embodiment of the present application provides a server comprising one or more processors, memory and one or more programs stored in the memory that, when executed by the one or more processors, cause the server to perform the aforementioned authentication method.

According to a third aspect, an embodiment of the present application provides a non-transitory computer readable storage medium storing one or more programs that, when executed by one or more processors of a server, cause the server to perform the aforementioned authentication method.

In the embodiments of the present application, a first device obtains, based on a first account of a first application, token information. The token information is used as an authentication credential of logging in to the first application by a device in a device group by using the first account. A second device having the token information can be authenticated while a user of the first device does not need to notify a user of the device in the device group of a key corresponding to the first account, thereby avoiding the risk of key exposure of the first account. In addition, when the second device logs in, based on the first account, to the first application, the first device suspends login to the first application by using the first account, so that the login conflict of the first account is avoided.

DESCRIPTION OF EMBODIMENTS

Figure 1:
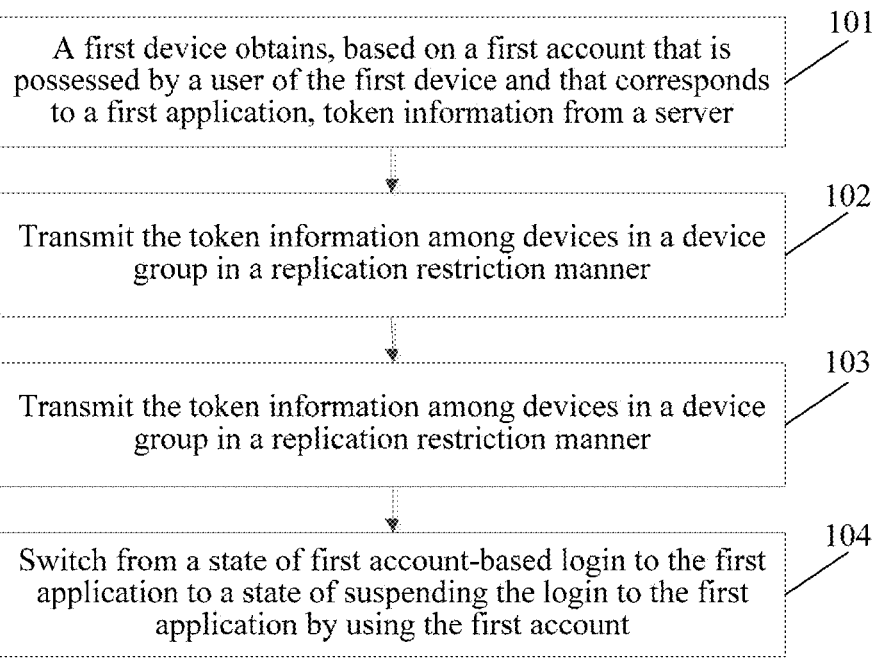
FIG. 1 is a schematic flowchart 1 of an authentication method according to some embodiments of the present application.

The present disclosure is further described below in detail with reference to the accompanying drawings and embodiments. It should be understood that the specific embodiments described herein are merely intended to explain the present disclosure rather than limiting the present disclosure.

It should be noted that the terms "first", "second", and the like in the embodiments of the present application are merely intended to distinguish different objects (for example, devices) rather than representing the particular sequence of the objects. It can be understood that the foregoing objects distinguished by the terms may be exchanged if permitted, so that the technical solutions recorded in the embodiments of the present application can be implemented with exchanged objects.

In addition, it should be further noted that the terms "include", "contain", and any variants thereof in the embodiments of the present application are intended to cover a non-exclusive inclusion. Therefore, in the context of a method or device that includes a series of elements, the method or device not only includes such elements, but also includes other elements not specified expressly, or may include inherent elements for implementing the method or device. Unless otherwise specified, an element limited by "include a/an . . . " does not exclude other related elements (for example, operations in the method or units in the device) existing in the method or the device that includes the element.

For example, an authentication method provided in the embodiments of the present application includes a series of operations, but the authentication method provided in the embodiments of the present application is not limited to the recorded operations. Similarly, a first device and a server provided in the embodiments of the present application also include a series of units, but the authentication method and device provided in the embodiments of the present application include, but are not limited to, the clearly recorded operations or units, and may further include operations that need to be performed or units that need to be included for obtaining related information or performing processing based on the information.

The embodiments of the present application record an authentication method that can be applied to a first device logging in, based on a first account, to an application (first application). The first application is not a specified application running in the first device, but is an application, for example, various social networking applications or various application providing a third-party service (including online services such as social contact, shopping, and take-out and offline services such as housekeeping), performing, based on an account and a key, authentication on a user and allowing to provide a related service to the first device when the authentication succeeds. Similarly, the first device is neither a specified device nor a specified type of device, but is a device that can run the application and has a communication capability and that is distinguished from another device in a device group.

The first device and the device in the device group may be a smartphone, a tablet computer, or a wearable device (for example, smart glasses or a smartwatch), or may be a smart car or an intelligent appliance (for example, an intelligent refrigerator, a smart battery, or a set-top box). An operating system of a smartphone may be an Android operating system, an iOS operating system, or any operating system (for example, a mobile Linux system or a Blackberry QNX operating system) that is developed by a third-party and that can run in a micro-computer structure (including at least a processor and a memory).

Various communications modules, for example, a near field communication (NFC) module, a Bluetooth communications module, an infrared communications module, a wireless compatibility certification (WiFi) communications module, or a cellular communications module, may be built in the first device and the device in the device group to support communication between the devices. A communications standard supported by the cellular communications module may be Code Division Multiple Access (CDMA), Wideband Code Division Multiple Access (WCDMA), Time Division-Synchronous Code Division Multiple Access (TD-SCDMA), or an evolved standard thereof. When needing to communicate with a target device, the first device in the device group may detect in an effective range of near field communication whether communication in a near field manner can be performed with the target device (for example, Bluetooth or WiFi, using WiFi as an example, an echo request message may be sent to the target device, and if a data packet returned by the target device is received, it indicates that the first device and the target device are in the effective range of near field communication). If not detecting a device in the effective range of near field communication, the first device may establish communication with the target device in a remote communication manner (for example, cellular communication).

The embodiments of the present application further relate to a server. The server may be a purpose-provided server (which may be alternatively in a server cluster manner) for implementing the embodiments of the present application. Certainly, the server may be a background server of the first application. For example, when the first application is a social networking application, a corresponding server 300 may be a background server of the social networking application.

Based on the foregoing recorded first device, device group, and server, an embodiment of the present application provides an authentication method. Referring to FIG. 1, FIG. 1 is a schematic flowchart of an authentication method. The method includes operation 101 to operation 104.

In operation 101, a first device obtains, based on a first account that is possessed by a user of the first device and that corresponds to a first application, token information from a server. The token information is generated based on the first account by the server, and is used for representing that the user of the first device has the ownership of the first account. In operation 102, the first device transmits the token information among devices in a device group in a replication restriction manner. The token information is further used for: performing, by the server, authentication on a second device that is in the device group and that has the token information; and granting permission of accessing the first account to the second device when the authentication succeeds, to support the second device to log in to the first application by using the first account. In operation 103, the first device determines that the second device logs in to the first application based on the permission of accessing the first account. Correspondingly, in operation 104, the first device switches from a state of first account-based login to the first application to a state of suspending the login to the first application by using the first account.

In the foregoing solution, a first device obtains, based on a first account of a first application, token information. The token information is used as an authentication credential of logging in to the first application by a device in a device group by using the first account. A second device having the token information can be authenticated while a user of the first device does not need to notify a user of the device in the device group of a key corresponding to the first account, thereby avoiding the risk of key exposure of the first account. In addition, when the second device logs in, based on the first account, to the first application, the first device suspends login to the first application by using the first account, so that the login conflict of the first account is avoided. In addition, the token information is transmitted in the device group in a non-replicable manner, thereby avoiding the case that multiple devices have the token information and log in, based on the first account, to the first application.

Figure 2:
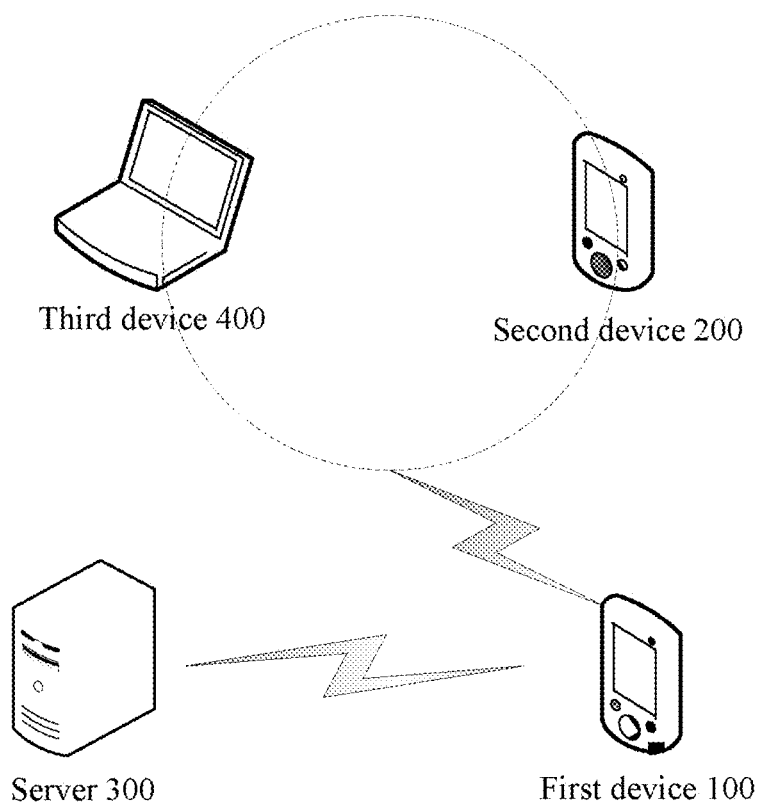
FIG. 2 is a schematic structural diagram of an authentication system according to some embodiments of the present application.

The embodiments of the present application provide the technical solution for the following scenario. Referring to FIG. 2, a first application runs in a first device 100. A user of the first device 100 registers, by using the first device 100, account information including a first account and corresponding key information for a service provided by using the first application. When the user of the first device 100 wants to temporarily alienate the first account to a second device 200 (a user of the second device 200 may be the same as the user of the first device 100, or may be different from the user of the first device 100) for use but does not want to expose a key corresponding to the first account to the second device 200, the technical solution can be used.

Figure 3:
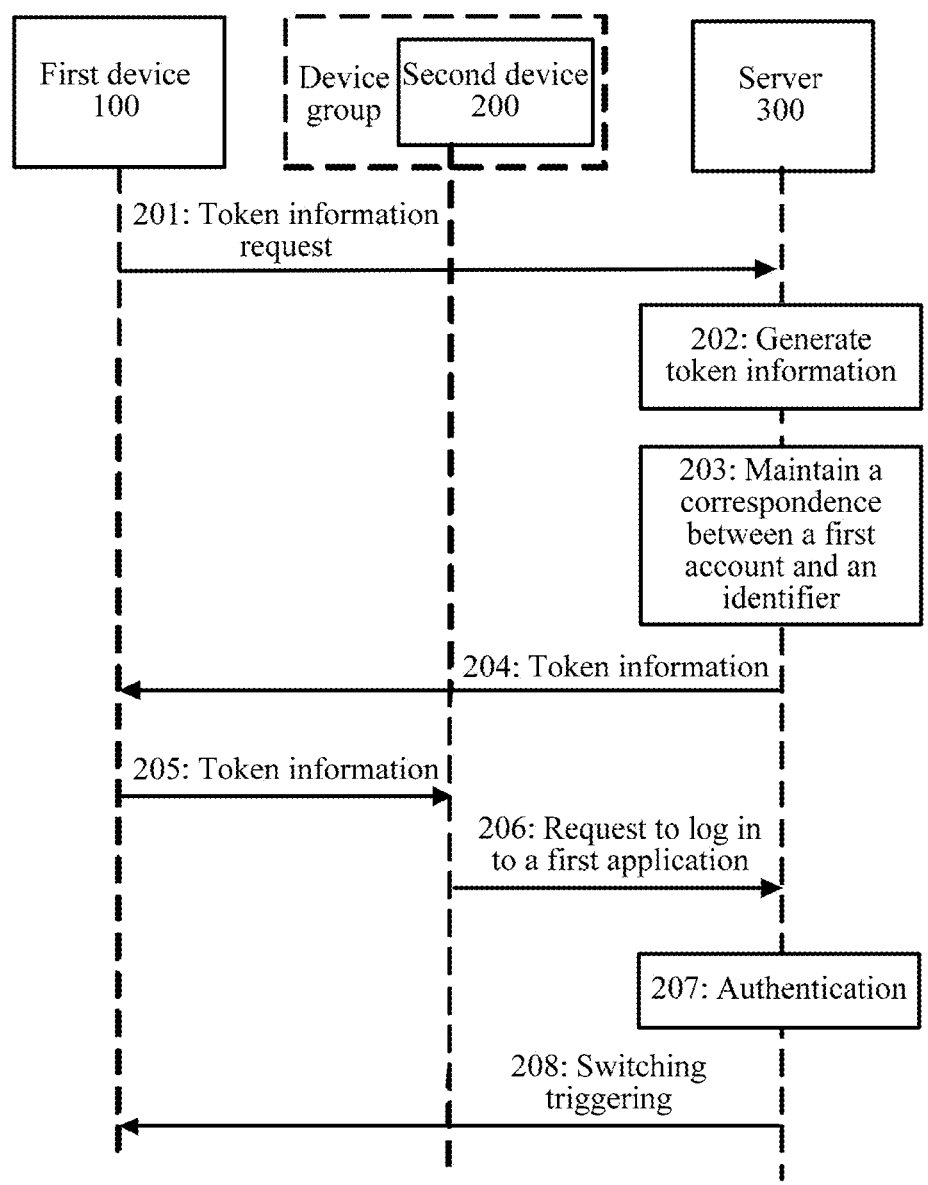
FIG. 3 is a schematic flowchart 2 of an authentication method according to some embodiments of the present application.

Referring to FIG. 3, FIG. 3 is a schematic flowchart of an authentication method. The method includes the following operations:

Operation 201: A first device 100 sends a token information request to a server 300.

In some embodiments, the token information request carries information about a first account that is registered by a user of the first device 100 and that corresponds to a first application.

Operation 202: The server 300 generates an identifier corresponding to the first account when receiving the token information request sent by the first device 100, and encrypts the identifier to obtain corresponding token information.

In some embodiments, the server 300 may encrypt the identifier by using an asymmetric encryption algorithm (or a symmetric encryption algorithm), to avoid malicious modification of the token information. In some other embodiments, the token information may further include a digital signature or a digital certificate. The first device 100 verifies the reliability of the token information by using the digital signature.

Operation 203: The server 300 maintains a correspondence between the first account and the identifier.

In some embodiments, when different first devices 100 send token information requests, the server 300 correspondingly generates identifiers according to accounts of first applications running in the first devices 100 (different identifiers are generated for different first accounts), and maintains a correspondence between a first account and a correspondingly generated identifier. For example, the server 300 may calculate the first account by using any function having a single mapping function, to obtain the corresponding identifier, or may not perform calculation by using the first account but only use the token information to represent that a user of the first device 100 has the ownership of the first account.

Operation 204: The server 300 transmits the token information to the first device 100.

Operation 205: The first device 100 transmits the token information among devices in a device group in a replication restriction manner.

In some embodiments, the first device 100 may actively initiate the transmission of the token information in the device group. Alternatively, in some other embodiments, when receiving a request of a device (which is assumed to be a second device 200) in the device group for logging in to the first application by using the first account, the first device 100 transmits the token information to the second device 200.

In some embodiments, when obtaining the token information, the second device 200 may request, based on the token information, the server 300 for permission of accessing the first account of using the first account to log in to the first application, and transmit the token information to another device in the device group in the replication restriction manner after the use is completed. Alternatively, in some other embodiments, the second device 200 may not request the server 300 for permission of accessing the first account when obtaining the token information, but directly transmit the token information to another device in the device group in the replication restriction manner.

The token information is transmitted in the device group in the replication restriction manner. Therefore, after transmitting the token information to the another device in the device group, the second device 200 does not reserve the token information. That is, once the token information is transmitted in the device group, only one device in the device group has the token information at any time.

The description is provided subsequently by using an example in which the second device 200 in the device group requests, based on the token information, for the permission of accessing the first account of logging in, based on the first account, to the first application.

Operation 206: A second device 200 in the device group requests, based on the token information, the server 300 to log in to the first application.

In some embodiments, a request sent by the second device 200 to the server 300 carries the token information. In this embodiment, the first device 100 transmits only the token information to the second device 200. That is, the second device 200 does not possess the first account that is of the first application and that is possessed by a user of the first device 100. Before the second device 200 uses the first account, the account security of the user of the first device 100 is ensured.

Operation 207: The server 300 performs authentication on the second device 200 that is in the device group and that has the token information, and allocates permission of accessing the first account to the second device 200 when the authentication succeeds.

In some embodiments, when receiving a request of the second device 200, the server 300 verifies, by using a digital signature (or a digital certificate) in the token information, whether the token information is delivered by the server 300 and is not modified; later, decrypts the token information to obtain the identifier; determines, by using the correspondence between the identifier and the first account that is maintained by the server 300, the first account the second device 200 requests to use; allocates the permission of accessing the first account to the second device 200; and sets a state of the first application running in the second device 200 to a login state based on the first account, so that a user of the second device 200 obtains the permission of accessing the first account.

In the foregoing process, the first device 100 is configured to enable the second device 200 to log in, based on the first account, to the first application without needing to notify the second device 200 of a key of the first account, thereby avoiding the account risk caused by the key exposure to the second device.

Operation 208: The server 300 triggers the first device 100 to switch from a state of first account-based login to the first application to a state of suspending the login to the first application by using the first account.

In some embodiments, after allocating the permission of accessing the first account to the second device 200 (that is, the second device 200 logs in, based on the first account, to the first application), the server 300 triggers the first device 100 to switch from a use state based on the first account to a state of suspending use. A display interface of the first device 100 may display a prompt that an operation cannot be performed currently, to support a user of the second device 200 to use, based on the first account, a service provided by the first application.

For the foregoing provided scenario, referring to FIG. 1, after logging in, based on the first account of a user of the first device 100, to the first application, the user of the first device 100 initiates an operation of applying for the token information to the server 300 on a graphical interface of the first application, and sends the token information to the second device 200 when receiving the token information delivered by the server 300. The second device 200 requests, based on the token information, the server 300 for the permission of accessing the first account. After the authentication based on the token information succeeds, the server 300 allocates the permission of accessing the first account to the second device 200. The first application running in second device 200 is in a login state based on the first account, and the first application running in the first device 100 is in a state of suspending login based on the first account.

In the foregoing of the embodiments of the present application, when requesting for the permission of accessing the first account, the second device 200 only has the token information but does not have information (for example, a name) about the first account. The first account is determined, by the server 300, based on the maintained correspondence between the identifier and the first account.

The description for the following scenario is further provided with reference to FIG. 2 in the embodiments of the present application. When requesting for the permission of accessing the first account, the second device 200 has the token information and the information (for example, the name) about the first account. The second device 200 requests, based on the name and the token information, for the permission of accessing the first account. The server 300 performs dual verification of the account and the token, thereby improving the authentication security.

Figure 4:
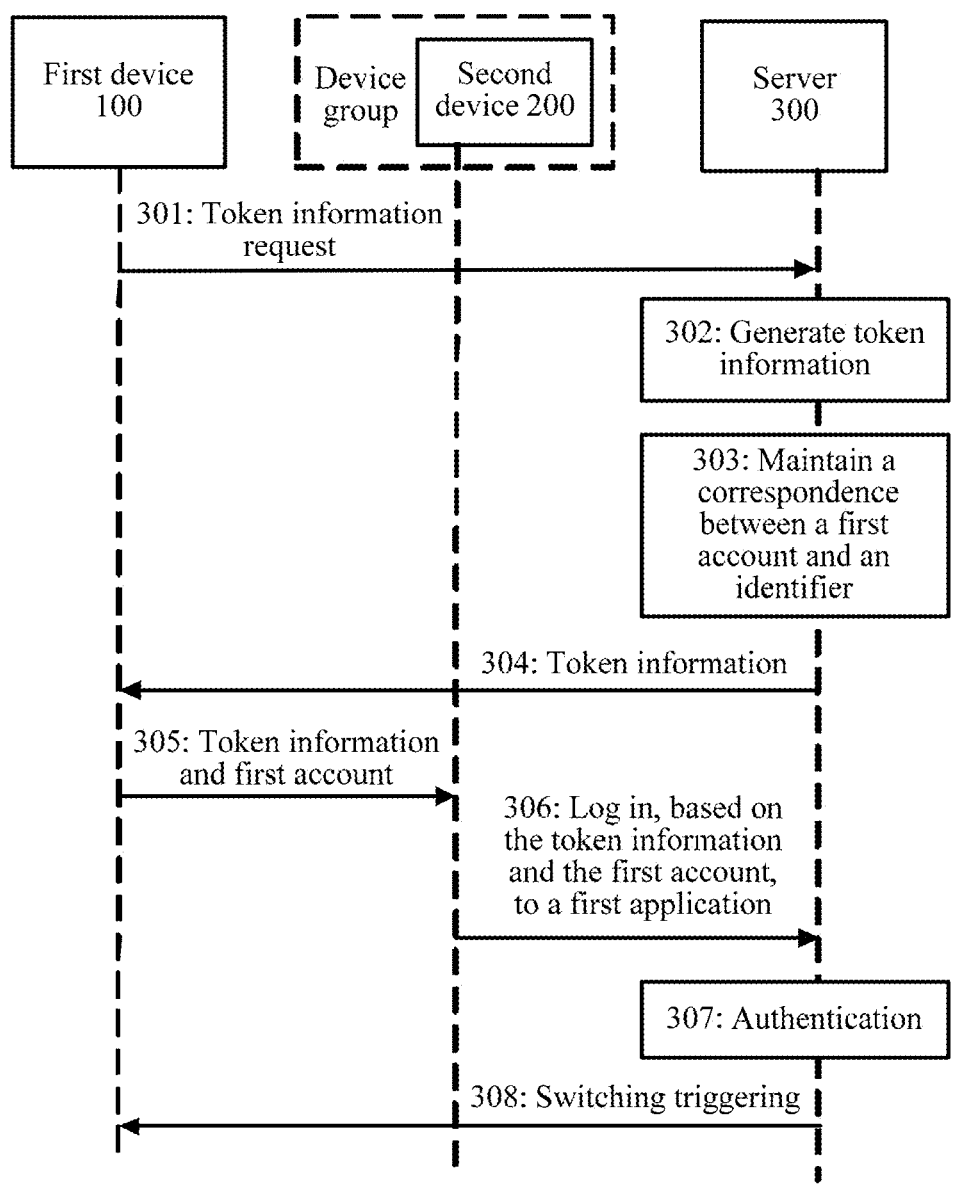
FIG. 4 is a schematic flowchart 3 of an authentication method according to some embodiments of the present application.

Referring to FIG. 4, FIG. 4 is a schematic flowchart of an authentication method. The method includes the following operations:

Operation 301: A first device 100 sends a token information request to a server 300.

In some embodiments, the token information request carries information about a first account that is registered by a user of the first device 100 and that corresponds to a first application.

Operation 302: The server 300 generates an identifier corresponding to the first account when receiving the token information request sent by the first device 100, and encrypts the identifier to obtain corresponding token information.

In some embodiments, the server 300 may encrypt the identifier by using an asymmetric encryption algorithm (or a symmetric encryption algorithm), to avoid malicious modification of the token information.

In some other embodiments, the token information may further include a digital signature or a digital certificate. The first device 100 verifies the reliability of the token information by using the digital signature.

Operation 303: The server 300 maintains a correspondence between the first account and the identifier.

Operation 303 may be implemented with reference to the foregoing operation 203.

Operation 304: The server 300 transmits the token information to the first device 100.

The description is provided subsequently by using an example in which a user of the first device 100 transmits the token information to a second device 200, so that the second device 200 logs in, based on the first account, to the first application.

Operation 305: The first device 100 transmits the token information and the first account to a second device 200.

In some embodiments, to avoid the problem of exposure of the token information and the first account due to that data transmission is maliciously intercepted, the first device 100 may separately transmit the token information and the first account to the second device 200. The server 300 subsequently performs authentication based on the first account and the token information. Therefore, although either the first account or the token information is maliciously obtained, authentication performed by the server 300 cannot succeed.

Operation 306: The second device 200 in a device group requests, based on the token information and the first account, the server 300 to log in to the first application.

In some embodiments, a request sent by the second device 200 to the server 300 carries the token information and information about the first account. The first device 100 transmits the token information and information about the first application to the second device 200. That is, the second device 200 has a name of the first account of the first application.

Operation 307: The server 300 performs authentication on the second device 200 that is in the device group and that has the token information, and allocates permission of accessing the first account to the second device 200 when the authentication succeeds.

In some embodiments, when receiving a request of the second device 200, the server 300 verifies, by using a digital signature (or a digital certificate) in the token information, whether the token information is delivered by the server 300 and is not modified; later, decrypts the token information to obtain the identifier; determines, by using the correspondence between the identifier and the first account that is maintained by the server 300, whether the first account corresponding to the identifier in the token information is the same as a first account carried in the request sent by the second server 200; allocates the permission of accessing the first account to the second device 200 if the first account corresponding to the identifier in the token information is the same as the first account carried in the request sent by the second server 200; and sets a state of the first application running in the second device 200 to a login state based on the first account, so that the second device 200 obtains the permission of accessing the first account.

In the foregoing process, the second device 200 can log in, based on the first account, to the first application without key exposure of the first account to a user of the second device 200, thereby avoiding the risk of the key exposure.

Operation 308: The server 300 triggers the first device 100 to switch from a state of first account-based login to the first application to a state of suspending the login to the first application by using the first account.

In some embodiments, after allocating the permission of accessing the first account to the second device 200 (that is, the second device 200 logs in, based on the first account, to the first application), the server 300 triggers the first device 100 to switch from a use state based on the first account to a state of suspending use. A display interface of the first device 100 may display a prompt that an operation cannot be performed currently, to support the second device 200 to use, based on the first account, a service provided by the first application.

It should be noted that the description is provided in FIG. 4 by using an example in which the second device 200 has the token information. The second device 200 may transmit the token information in the device group in a replication restriction manner. When a third device 400 (another device different from the second device 200) in the device group has the token information and requests the server 300 for the permission of accessing the first account, for implementation of authentication performed by the server 300, refer to the foregoing authentication performed on the second device 200 by the server 300.

In addition, the description is provided in the foregoing by using an example in which the first device 100 and a device in the device group belong to different users. The token information is transmitted to the device in the device group, so that the device in the device group can log in to the first application by using the first account while not having a key of the first account. Therefore, key information of the first account does not need to be exposed to a user of another device (that is, a user of the device in the device group).

The description of processing of suspending the permission of accessing the first account allocated to the second device 200 after the second device 200 obtains the permission of accessing the first account is further provided in the embodiments of the present application with reference to FIG. 2.

In some embodiments, the server 300 needs to determine when the permission of accessing the first account allocated to the second device 200 is suspended. It can be determined, by combining the following manners, when the permission of accessing the first account allocated to the second device 200 is suspended.

(1) The second device 200 has the token information. When the second device 200 no longer has the token information, it indicates that the token information is transmitted in the device group in a replication restriction manner, and is possessed by another device in the device group. To avoid that the second device 200 and the another device in the device group have the permission of accessing the first account at the same time, the permission of accessing the first account that is of the second device 200 and that corresponds to the first account should be suspended in this case.

During actual implementation, based on the determining in the manner (1), it may be determined, by combining the following manner (2), when the permission of accessing the first account of the second device 200 is suspended.

(2) The second device 200 has the token information, and the token information is not out of a predefined period. Once the second device does not have the token information, or the second device 200 has the token information but the token information is out of the predefined period, the permission of accessing the first account allocated to the second device 200 is suspended.

In some embodiments, the token information delivered by the server 300 to the first device 100 may not have the limitation of the predefined period. That is, when the token information is transmitted in the device group in a replication restriction manner, the transmission time is not limited.

In some other embodiments, considering the security, the token information has the predefined period (being valid in a particular period). The token information is valid in a period of time, and when the token information is transmitted in the device group and is out of the predefined period, the token information is invalid, and the device in the device group cannot obtain the permission of accessing the first account even if having the token information.

Referring to FIG. 2, the description of the foregoing processing after the second device 200 obtains the permission of accessing the first account (that is, logging in, based on the first account, to the first application) is further provided. It is assumed that the token information delivered by the server 300 to the first device 100 in the foregoing embodiment further carries time limit information. For example, when the token information carries a digital certificate, the time limit information may be set based on a predefined period of the digital certificate.

Figure 5:
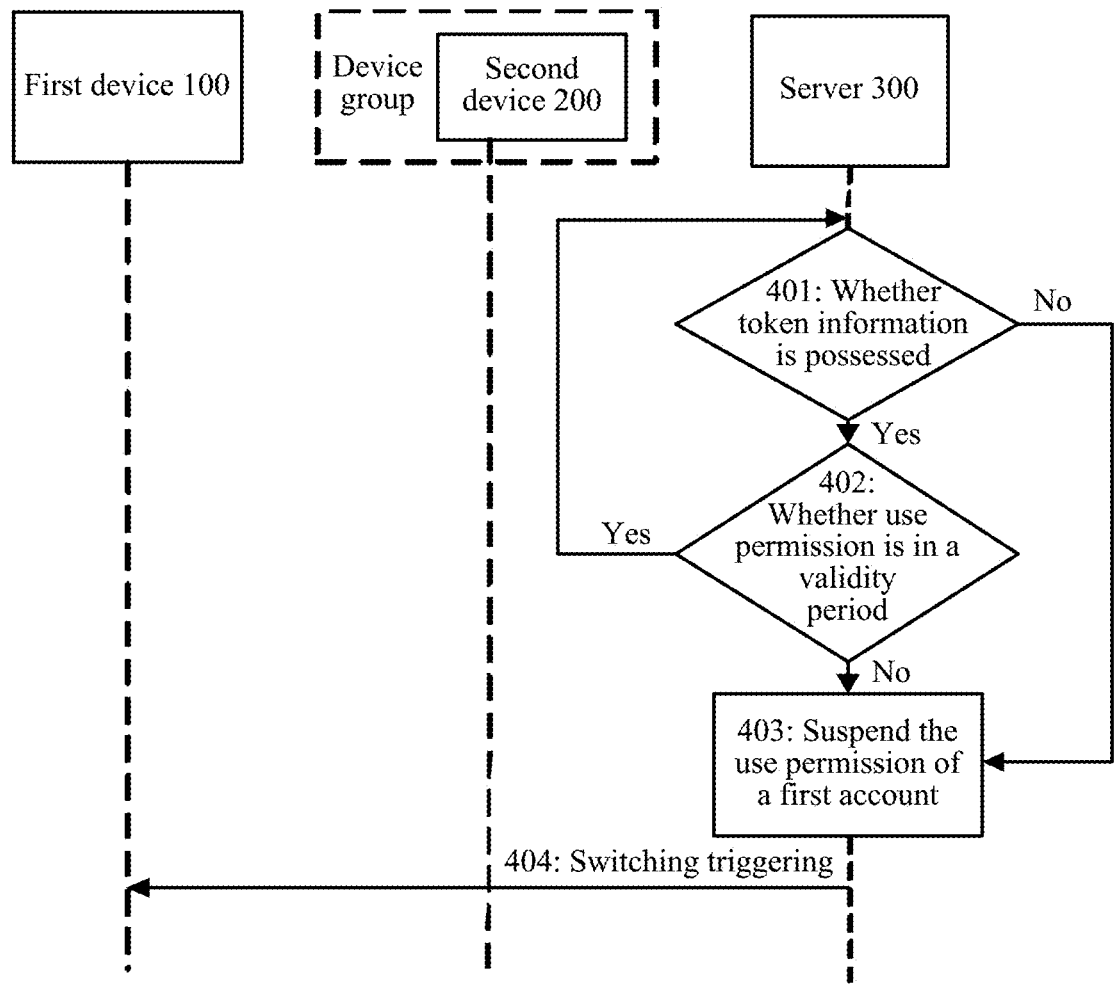
FIG. 5 is a schematic flowchart 4 of an authentication method according to some embodiments of the present application.

Referring to FIG. 5, FIG. 5 is a schematic flowchart of an authentication method. The method includes the following operations:

Operation 401: The server 300 detects whether the second device 200 has the token information; and if yes, performs operation 402; otherwise, performs operation 403.

Operation 402: The server 300 detects whether the permission of accessing the first account that is obtained by the second device 200 is in a predefined period; if the permission of accessing the first account is not out of the valid period, returns back to operation 401; otherwise, performs operation 403.

Operation 403: The server 300 suspends the permission of accessing the first account that is allocated to the second device 200 and that corresponds to the first account.

Operation 404: The server 300 triggers the first device 100 to switch from a state of first account-based login to the first application to a state of suspending the login to the first application by using the first account.

After any device that is in the device group and that has the token information obtains, based on the token information, the permission of accessing the first account, the server 300 detects whether the device having the permission of accessing the first account has the token information and whether the token information is out of the predefined period, thereby implementing the transmission detection of the token information in the device group, and ensuring the use security of the first account.

This embodiment of the present application describes the processing in the following scenarios.

(1) The first device 100 and the device in the device group belong to the same user. After the second device 200 obtains the permission of accessing the first account, the user needs to use the first device 100 and log in, based on the first account, to the first application (in this case, the second device 200 is usually used as a login device to the first application temporarily.

(2) The first device 100 and the device in the device group belong to different users. After the permission of accessing the first account that is of a user of the first device 100 and that corresponds to the first application is allocated to a user of the second device 200, the user of the first device 100 needs to log in to the first application by using the first account, that is, the user of the first device 100 wants to suspend the behavior of logging in to the first application on the second device 200 by using the first account by the user of the second device 200.

In the foregoing two scenarios, the server 300 needs to retrieve the permission of accessing the first account that is allocated to the second device 200 and that corresponds to the first account, so that the first device 100 can log in, based on the first account, to the first application.

Figure 6:
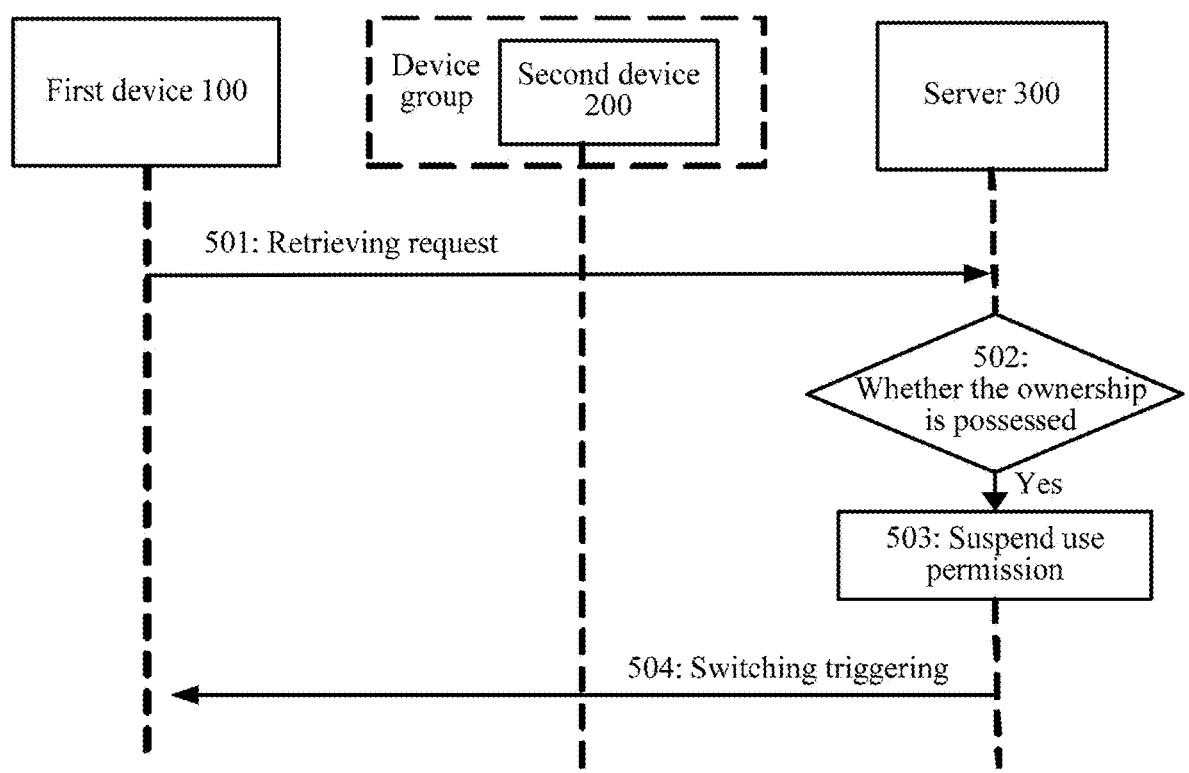
FIG. 6 is a schematic flowchart 5 of an authentication method according to some embodiments of the present application.

With reference to FIG. 2, and referring to FIG. 6, FIG. 6 is a schematic flowchart of an authentication method, the method includes the following operations:

Operation 501: The first device 100 sends a retrieving request carrying token information to the server 300.

In some embodiments, the retrieving request carries the token information requested by the first device 100 from the server. Use permission of a first account is retrieved from a device that is in a device group and that has the token information, so that a user can log in, based on the first account, to a first application on the first device.

Figure 7:
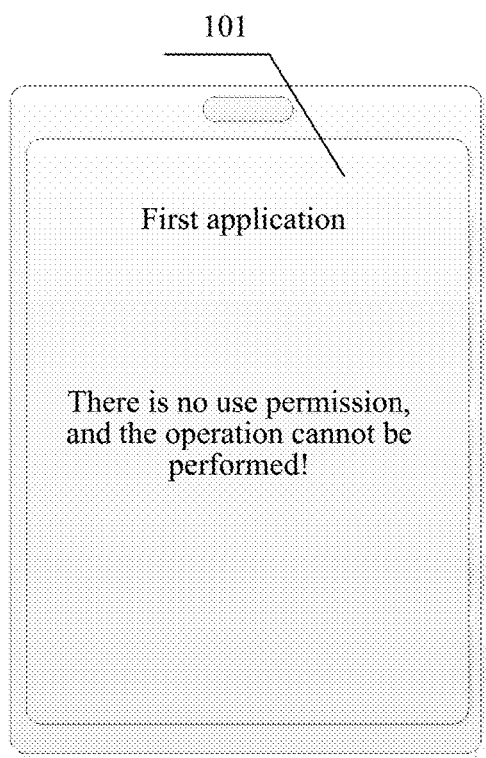
FIG. 7 is a schematic diagram of a non-operational state of a first application running in a first device according to some embodiments of the present application.
Figure 8:
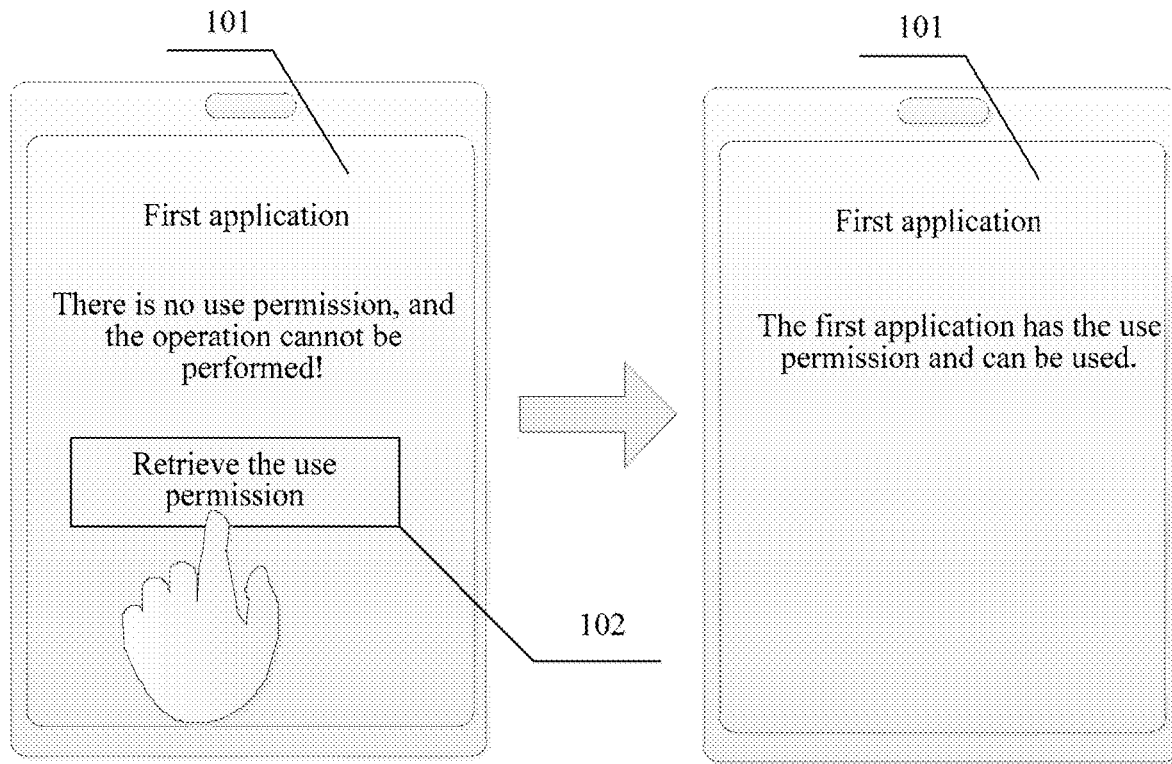
FIG. 8 is a schematic diagram of an operation of retrieving permission of accessing the first account of a first account by a first device according to some embodiments of the present application.

Referring to FIG. 7, when the first device 100 suspends a state of first account-based login to the first application, a display window 101 of the first application is in a non-operational state, which is equivalent to blocking reception of an operation input by a user, and can provide a virtual button 102, shown in FIG. 8, for retrieving the permission of accessing the first account of the first application. When the virtual button 102 is triggered, the first device 100 correspondingly performs the foregoing operation 501, to trigger the server 300 to retrieve the allocated permission of accessing the first account, so that the display window of the first application in the first device 100 is in an operational state again.

Operation 502: The server 300 determines whether the first device 100 has the ownership of the first account; and if yes, performs operation 503; otherwise, stops processing.

Operation 503: The server 300 suspends the permission of accessing the first account that is allocated to the second device 200 and that corresponds to the first account.

The token information has an encrypted identifier, and the identifier corresponds to the first account. An identifier that can be maintained by the server 300 and an identifier (for example, a product sequence number) of the first device 100 are sent to the server 300 when the server 300 is requested for the token information. The server 300 encrypts the identifier corresponding to the first account and the identifier of the first device 100 to form the token information. That is, in this embodiment, the token information may carry the following encrypted identifiers: the identifier corresponding to the first account and the identifier of the first device 100.

The server 300 may determine, in the following manner, whether the first device 100 has the ownership of the first account: decrypting the token information to obtain the identifier of the first device 100; matching the identifier of the first device 100 with a plaintext identifier of the first device 100 that is carried in the retrieving request; and determining that a device sending the retrieving request has the ownership of the first account if the matching succeeds.

Operation 504: The server 300 triggers the first device 100 to switch from the state of suspending the first account-based login to the first application to the state of login to the first application by using the first account.

In this embodiment, the first device 100 sending the retrieving request is verified by using the token information; the permission of accessing the first account that is allocated to the second device 200 and that corresponds to the first account is suspended when it is determined that the first device 100 has the ownership of the first account, and the state of login to the first application by the first device 100 by using the first account is recovered, so as to facilitate the use of the first application based on the first device 100.

Figure 9:
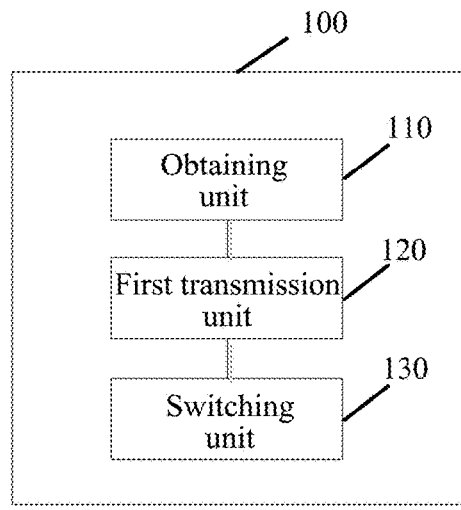
FIG. 9 is a schematic diagram of a functional structure of a first device according to some embodiments of the present application.

The description of a function structure of the foregoing first device is provided in an embodiment of the present application. Referring to FIG. 9, FIG. 9 is a schematic diagram of a function structure of the first device 100, including:

an obtaining unit 110, configured to obtain, based on a first account that is possessed by a user of the first device 100 and that corresponds to a first application, token information from a server 300, the token information being generated based on the first account by the server 300, and being used for representing that the user of the first device 100 has the ownership of the first account;

a first transmission unit 120, configured to transmit the token information among devices in a device group in a replication restriction manner, the token information being further used for: performing, by the server 300, authentication on a second device 200 that is in the device group and that has the token information; and granting permission of accessing the first account to the second device 200 when the authentication succeeds, to support the second device 200 to log in to the first application by using the first account; and a switching unit 130, configured to: switch from a state of first account-based login to the first application to a state of suspending the login to the first application by using the first account when it is determined that the second device 200 logs in to the first application based on the permission of accessing the first account.

The obtaining unit 110 is further configured to obtain the token information from the server 300 by using a token information request. The token information request is used for: generating, by the server 300, an identifier corresponding to the first account; encrypting the identifier to obtain the token information; and maintaining a correspondence between the first account and the identifier.

The correspondence between the first account and the identifier is used for: decrypting, by the server 300, the token information to obtain the first account; determining, based on the correspondence, the first account corresponding to the identifier; and allocating the permission of accessing the first account to the second device 200.

The obtaining unit 110 is further configured to obtain the token information from the server 300 by using a token information request. The token information request is used for encrypting the identifier by the server 300 to obtain the token information.

The token information and information about the first account are further used for being sent to the server 300 by the second device 200, so that the server 300 verifies whether the first account matches the identifier carried in the token information, and allocates the permission of accessing the first account to the second device 200.

The token information carries time limit information, used for: detecting, by the server 300, whether the permission of accessing the first account that is obtained by the second device 200 is within a predefined period; and suspending the permission of accessing the first account that is allocated to the second device 200 when the predefined period expires.

The first device 100 further includes:

a retrieving unit 140, configured to send a retrieving request to the server 300 for the token information, the retrieving request carrying the token information, the token information being used for suspending the permission of accessing the first account that is allocated to the second device 200 and that corresponds to the first account when the server 300 determines that the user of the first device 100 has the ownership of the first account.

The switching unit 130 is further configured to switch from the state of suspending the login to the first application by using the first account to the state of login to the first application by using the first account.

The token information is further used for: detecting, by the server 300, whether the second device 200 that is in the device group and that is allocated with the permission of accessing the first account corresponding to the first account has the token information; and suspending the permission of accessing the first account that is allocated to the second device 200 and that corresponds to the first account when the second device 200 does not have the token information.

During actual implementation, logical processing functions performed by the units in the first device 100 may be implemented by a processor, a micro control unit (MCU), an application-specific integrated circuit (ASIC), or a field programmable gate array (FPGA) in the first device 100. Communication functions of the first device 100 with the second device 200 and the server 300 may be implemented by a WiFi communications chip, a cellular communications chip, and a corresponding peripheral circuit and antenna in the first device 100.

A function structure of the foregoing server 300 is further described in the embodiments of the present application.

Figure 10:
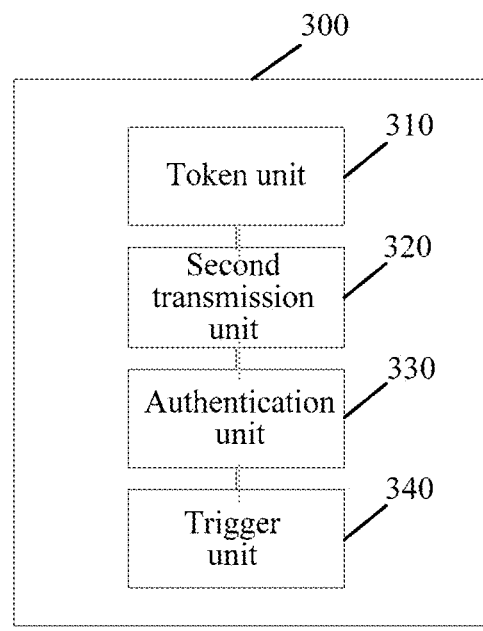
FIG. 10 is a schematic diagram of a functional structure of a server according to some embodiments of the present application.

Referring to FIG. 10, FIG. 10 is a schematic diagram of a function structure of the server 300, including:

a token unit 310, configured to generate, based on a first account that is possessed by a user of a first device 100 and that corresponds to a first application, token information corresponding to the first account, the token information representing that the user of the first device 100 has the ownership of the first account;

a second transmission unit 320, configured to send the token information to the first device 100, the token information being used for being transmitted by the first device 100 among devices in a device group in a replication restriction manner;

an authentication unit 330, configured to: perform, based on the token information, authentication on a second device 200 that is in the device group and that has the token information; and allocate permission of accessing the first account to the second device 200 when the authentication succeeds, to support the second device 200 to log in to the first application by using the first account; and a trigger unit 340, configured to: trigger the first device 100 to switch from a state of first account-based login to the first application to a state of suspending the login to the first application by using the first account when it is determined that the second device 200 logs in to the first application based on the permission of accessing the first account.

The token unit 310 includes: a receiving module, configured to generate an identifier corresponding to the first account after receiving a token information request sent by the first device 100; and encryption module, configured to: encrypt the identifier to obtain the token information, and maintain a correspondence between the first account and the identifier.

The authentication unit 330 includes:

a decryption module, configured to decrypt the token information sent by the second device 200 to obtain the identifier;

an allocation module, configured to: determine, based on the correspondence, the first account corresponding to the identifier; and allocate the permission of accessing the first account to the second device 200; or verify, based on the correspondence, whether the first account sent by the second device 200 matches the identifier carried in the token information; and allocate the permission of accessing the first account to the second device 200.

The token information carries time limit information. The authentication unit 330 is further configured to: detect, based on the time limit information, whether the permission of accessing the first account that is obtained by the second device 200 is within a predefined period; and suspend the permission of accessing the first account that is allocated to the second device 200 and that corresponds to the first application when the predefined period expires.

The second transmission unit 320 is further configured to: receive a retrieving request that is sent by the first device 100 for the token information. The retrieving request carries the token information. The authentication unit 330 is further configured to suspend the permission of accessing the first account that is allocated to the second device 200 and that corresponds to the first account when it is determined, based on the token information, that a user of the first device 100 has the ownership of the first account. The trigger unit 340 is further configured to trigger the first device 100 to switch from the state of suspending the login to the first application by using the first account to the state of login to the first application by using the first account.

The authentication unit 330 is further configured to: detect whether the second device 200 that is in the device group that is allocated with the permission of accessing the first account corresponding to the first account has the token information; and suspend the permission of accessing the first account that is allocated to the second device 200 and that corresponds to the first account when the second device 200 does not have the token information.

During actual implementation, logical processing functions performed by the units in the server 300 may be implemented by a processor, a micro control unit (MCU), an application-specific integrated circuit (ASIC), or a field programmable gate array (FPGA) in the server 300. Communication functions of the server 300 with the second device 200 and the first device 100 may be implemented by a WiFi communications chip, a cellular communications chip, and a corresponding peripheral circuit and antenna in the server 300.

Figure 11:
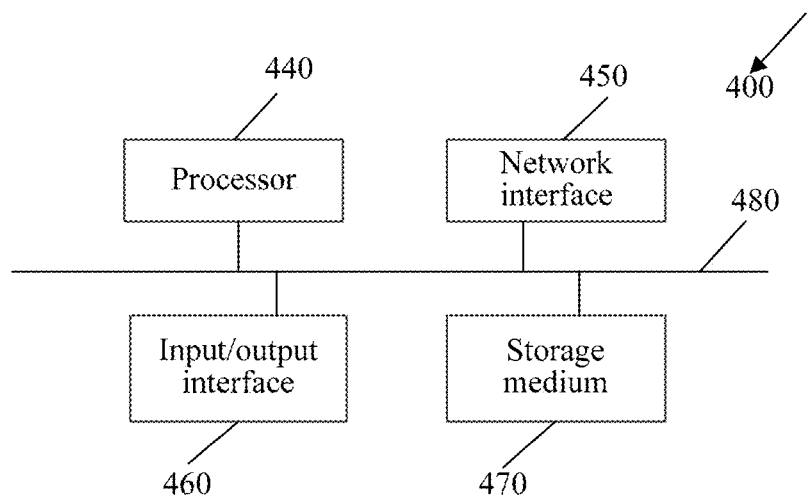
FIG. 11 is a schematic diagram of a hardware structure of a first device and a server according to some embodiments of the present application.

It should be noted that for the foregoing first device 200 and the server 300, a hardware structure 400 shown in FIG. 11 may be used, including: a processor 440, an input/output interface (for example, one or more of a display, a keyboard, a touch screen, a speaker, or a microphone) 460, a storage medium 470 that is configured to store an operating system and one or more application programs, and a network interface 450. The network interface is configured to support data transmission with an external device. The components can be connected and perform communication by using a system bus 480.

In some embodiments, the input/output interface 460 includes a display configured to display information and an input device such as a mouse or a keyboard that is used by a user to input information. The display and the input device are both connected to the processor 440 by using an I/O controller connected to the system bus 480. The input/output interface 460 may further include the I/O controller, so as to receive and process input from multiple other devices, such as a keyboard, a mouse, and an electronic stylus. Similarly, the I/O controller further provides a display, a printer, or another type of output device.

The storage medium 470 is connected to the processor 440 by using a large-capacity storage controller (not shown) connected to the system bus 480. The storage medium 470 and a computer readable medium relevant to the large-capacity storage device provide non-volatile storage to the server 300. That is, the storage medium 470 may include a computer readable medium (not shown), such as a hard disk or a CD-ROM driver.

According to various embodiments of the present disclosure, the server 300 may run by connecting to a remote computer on a network by using a network such as the Internet. That is, the server 300 may be connected to a network by using the network interface 450 connected to the system bus 480, or the server 300 may be connected to a network of another type or a remote computer system (not shown) by using the network interface 450.

An authentication system shown in FIG. 2 is further recorded in an embodiment of the present application, including the foregoing first device 100 and the server 300.

The first device 100 is configured to: obtain, based on a first account that is possessed by a user of the first device 100 and that corresponds to a first application, token information from the server, the token information being generated based on the first account by the server and being used for representing that the user of the first device 100 has the ownership of the first account; transmit the token information among devices in a device group in a replication restriction manner, the token information being further used for: performing, by the server, authentication on a second device 200 that is in the device group and that has the token information; and granting permission of accessing the first account to the second device 200 when the authentication succeeds, to support the second device 200 to log in to the first application by using the first account; and switch from a state of first-account based login to the first application to a state of suspending the login to the first application by using the first account when it is determined that the second device 200 logs in to the first application based on the permission of accessing the first account.

The server 300 is configured to: generate, based on the first account that is possessed by the user of the first device 100 and that corresponds to the first application, the token information corresponding to the first account, the token information representing that the user of the first device 100 has the ownership of the first account;

send the token information to the first device 100, the token information being used for being transmitted by the first device 100 among the devices in the device group in the replication restriction manner;

perform, based on the token information, authentication on a second device 200 that is in the device group and that has the token information, and allocate the permission of accessing the first account to the second device 200 when the authentication succeeds, to support the second device 200 to log in to the first application by using the first account; and trigger the first device 100 to switch from the state of first account-based login to the first application to the state of suspending the login to the first application by using the first account when it is determined that the second device 200 logs in to the first application based on the permission of accessing the first account.

In some embodiments, the first device 100 is further configured to: obtain the token information from the server by using a token information request, the token information request being used for generating, by the server, an identifier corresponding to the first account; and encrypt the identifier to obtain the token information; and maintain a correspondence between the first account and the identifier.

In some embodiments, the correspondence between the first account and the identifier is used for: decrypting, by the server, the token information to obtain the identifier; determining, based on the correspondence, the first account corresponding to the identifier; and allocating the permission of accessing the first account to the second device 200.

Alternatively, the token information and information about the first account are used for being sent to the server by the second device 200, so that the server verifies, based on the correspondence, whether the first account sent by the second device 200 matches the identifier carried in the token information, and allocates the permission of accessing the first account to the second device 200 when the first account matches the identifier.

In some embodiments, the token information carries time limit information, used for: detecting, by the server, whether the permission of accessing the first account that is obtained by the second device 200 is within a predefined period; and suspending the permission of accessing the first account that is allocated to the second device 200 when the predefined period expires.

In some embodiments, the first device 100 is further configured to: send a retrieving request to the server for the token information, the token information carried in the retrieving request being used for: suspending, by the server, the permission of accessing the first account that is allocated to the second device 200 and that corresponds to the first account when the server determines that the user of the first device 100 has the ownership of the first account; and switching from the state of suspending the login to the first application by using the first account to the state of recovering the login to the first application by using the first account.

In some embodiments, the token information is further used for: detecting, by the server, whether the second device 200 that is in the device group and that is allocated with the permission of accessing the first account corresponding to the first account has the token information; and suspending the permission of accessing the first account that is allocated to the second device 200 and that corresponds to the first account when the second device 200 does not have the token information.

In some embodiments, the server 300 is further configured to: generate the identifier corresponding to the first account when receiving the token information request sent by the first device 100; encrypt the identifier to obtain the token information; and maintain the correspondence between the first account and the identifier.

In some embodiments, the server 300 is further configured to: decrypt the token information sent by the second device 200 to obtain the identifier; determine, based on the correspondence, the first account corresponding to the identifier; and allocate the permission of accessing the first account to the second device 200; or decrypt the token information sent by the second device 200 to obtain the identifier; verify, based on the correspondence, whether the first account sent by the second device 200 matches the identifier carried in the token information sent by the second device 200; and allocate the permission of accessing the first account to the second device 200 when the first account matches the identifier.

In some embodiments, the token information carries the time limit information. The server 300 detects, based on the time limit information, whether the permission of accessing the first account that is obtained by the second device 200 is within a predefined period; and suspends the permission of accessing the first account that is allocated to the second device 200 and that corresponds to the first application when the predefined period expires.

In some embodiments, the server 300 is further configured to: receive the retrieving request sent by the first device 100 for the token information, the retrieving request carrying the token information; suspend the permission of accessing the first account that is allocated to the second device 200 and that corresponds to the first account when it is determined, based on the token information, that the user of the first device 100 has the ownership of the first account; and trigger the first device 100 to switch from the state of suspending the login to the first application by using the first account to the state of recovering the login to the first application by using the first account.

In some embodiments, the server 300 is further configured to: detect whether the second device 200 that is in the device group and that is allocated with the permission of accessing the first account corresponding to the first account has the token information; and suspend the permission of accessing the first account that is allocated to the second device 200 and that corresponds to the first account when the second device 200 does not have the token information.

An embodiment of the present application further provides a first device, the first device including:

a storage medium, configured to store computer executable instructions; and a processor, configured to execute the computer executable instructions stored in the storage medium, the computer executable instructions including:

obtaining, based on a first account that is possessed by a user of the first device and that corresponds to a first application, token information from a server, the token information being generated based on the first account by the server, and being used for representing that the user of the first device has the ownership of the first account;

transmitting the token information among devices in a device group in a replication restriction manner, the token information being further used for: performing, by the server, authentication on a second device that is in the device group and that has the token information; and granting permission of accessing the first account to the second device when the authentication succeeds, to support the second device to log in to the first application by using the first account; and switching from a state of first account-based login to the first application to a state of suspending the login to the first application by using the first account when it is determined that the second device logs in to the first application based on the permission of accessing the first account.

An embodiment of the present application provides a server, the server including:

a storage medium, configured to store computer executable instructions; and a processor, configured to execute the computer executable instructions stored in the storage medium, the computer executable instructions including:

generating, based on a first account that is possessed by a user of a first device and that corresponds to a first application, token information corresponding to the first account, the token information representing that the user of the first device has the ownership of the first account;

sending the token information to the first device, the token information being shared by the first device with devices in a device group in a replication restriction manner; and performing, based on the token information, authentication on a second device that is in the device group and that has the token information; and granting permission of accessing the first account to the second device when the authentication succeeds, to support the second device to log in to the first application by using the first account; and triggering the first device to switch from a state of first account-based login to the first application to a state of suspending the login to the first application by using the first account when it is determined that the second device logs in to the first application based on the permission of accessing the first account.

In this embodiment of the present application, when the foregoing method is implemented in the form of a software function module and sold or used as an independent product, the method may be stored in a computer readable storage medium. Based on such an understanding, the technical solutions of the embodiments of the present application essentially, or the part contributing to the existing technology, may be implemented in the form of a software product. The computer software product is stored in a storage medium, and includes several instructions for instructing a computer device (which may be a personal computer, a server, a network device, or the like) to perform all or some of the operations of the methods described in the embodiments of the present application. The foregoing storage medium includes various media such as a U disk, a mobile hard disk, a read-only memory (ROM), a magnetic disk, or an optical disc that can store program code. In this way, the embodiments of the present application are not limited to any particular combination of hardware and software.

An embodiment of the present application further provides a non-transitory computer readable medium which may be a ROM (for example, a read-only memory, a FLASH memory, or a transfer apparatus), a magnetic storage medium (for example, a magnetic tape or a disk drive), an optical storage medium (for example, a CD-ROM, a DVD-ROM, a corrugated board, or a tape), and other well-known types of program memories. The computer readable medium stores computer executable instructions (for example, binary executable instructions of a projection application such as Tencent video. Referring to FIG. 2, the instructions, when executed, cause at least one processor of a first device 100 to perform the following operations:

obtaining, based on a first account that is possessed by a user of the first device and that corresponds to a first application, token information from a server 300, the token information being generated based on the first account by the server, and being used for representing that the user of the first device 100 has the ownership of the first account;

transmitting the token information among devices in a device group in a replication restriction manner, the token information being further used for: performing, by the server 300, authentication on a second device 200 that is in the device group and that has the token information; and granting permission of accessing the first account to the second device 200 when the authentication succeeds, to support the second device 200 to log in to the first application by using the first account; and switching from a state of first account-based login to the first application to a state of suspending the login to the first application by using the first account when it is determined that the second device 200 logs in to the first application based on the permission of accessing the first account.

A non-transitory computer readable medium, which may be a ROM (for example, a read-only memory, a FLASH memory, or a transfer apparatus), a magnetic storage medium (for example, a magnetic tape or a disk drive), an optical storage medium (for example, a CD-ROM, a DVD-ROM, a corrugated board, or a tape), and other well-known types of program memories, is recorded in an embodiment of the present application. The computer readable medium stores computer executable instructions (for example, binary executable instructions of a projection application such as Tencent video. Referring to FIG. 2, the instructions, when executed, cause at least one processor of the server 300 to perform the following operations:

generating, based on a first account that is possessed by a user of a first device 100 and that corresponds to a first application, token information corresponding to the first account, the token information representing that the user of the first device 100 has the ownership of the first account;

sending the token information to the first device 100, the token information being used for being transmitted by the first device 100 among devices in a device group in a replication restriction manner;

performing, based on the token information, authentication on a second device 200 that is in the device group and that has the token information; and granting permission of accessing the first account to the second device 200 when the authentication succeeds, to support the second device 200 to log in to the first application by using the first account; and triggering the first device 100 to switch from a state of first account-based login to the first application to a state of suspending the login to the first application by using the first account when it is determined that the second device 200 logs in to the first application based on the permission of accessing the first account.

In conclusion, a first device obtains, based on a first account of a first application, token information. The token information is used as an authentication credential of logging in to the first application by a device in a device group by using the first account. A second device having the token information can be authenticated while a user of the first device does not need to notify a user of the device in the device group of a key corresponding to the first account, thereby avoiding the risk of key exposure of the first account. In addition, when the second device logs in, based on the first account, to the first application, the first device suspends login to the first application by using the first account, so that the login conflict of the first account is avoided.

A person of ordinary skill in the art may understand that all or some of the operations of the foregoing method embodiments may be implemented by a program instructing relevant hardware. The program may be stored in a computer readable storage medium. During performing, the program performs the operations of the foregoing method embodiments. The foregoing storage medium includes: a medium such as a mobile storage device, a random access memory (RAM), a read-only memory (ROM), a magnetic disk, or a compact disc that can store program code.

Alternatively, when the integrated module in the present disclosure is implemented in the form of a software function module and sold or used as an independent product, the integrated module may be stored in a computer readable storage medium. Based on such an understanding, the technical solutions of the embodiments of the present application essentially, or the part contributing to the existing technology, may be implemented in the form of a software product. The computer software product is stored in a storage medium, and includes several instructions for instructing a computer device (which may be a personal computer, a server, a network device, or the like) to perform all or some of the operations of the methods described in the embodiments of the present application. The foregoing storage medium includes: a medium such as a mobile storage device, a ROM, a RAM, a magnetic disk, or a compact disc that can store program code.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An authentication method performed at a server having one or more processors and memory storing one or more programs to be executed by the one or more processors, the method comprising:
receiving, from a first device, a token information request for token information corresponding to a first account registered with a first application, wherein the first application is currently logged in by the first account on the first device;
generating, based on the first account that is possessed by a user of the first device and that corresponds to the first application, the token information corresponding to the first account registered with the first application, the token information representing that the user of the first device has the ownership of the first account, wherein the token information is further encrypted with an identifier corresponding to the first account;

sending the token information to the first device, wherein the token information is further shared by the first device with one device in a device group at a time in a replication restriction manner;

receiving, from a second device, a login request to log into the first application using the first account on the second device, the login request including the token information, wherein the second device receives the token information from the first device without decrypting the token information to retrieve the identifier and a key corresponding to the first account;

performing, based on the token information, authentication on (1) whether the second device is in the device group and (2) whether the identifier decrypted from the token information corresponds to the first account indicated by the login request received from the second device;

granting permission to log into the first application using the first account on the second device when the authentication succeeds; and triggering the first device to switch from a state of first account-based login to the first application to a state of suspending the login to the first application by using the first account when it is determined that the second device logs in to the first application using the first account based on the permission.

2. The method according to claim 1, wherein the generating the token information corresponding to the first account comprises:

generating the identifier corresponding to the first account after the token information request sent by the first device;

encrypting the identifier corresponding to the first account to obtain the token information; and maintaining a correspondence between the first account and the identifier.

3. The method according to claim 2, wherein the performing the authentication comprises:

decrypting the token information sent by the second device to obtain the identifier;

determining, based on the correspondence, that the first account corresponding to the identifier; and allocating the permission to log into the first application using the first account to the second device.

4. The method according to claim 2, wherein the performing the authentication comprises:

decrypting the token information received from the second device to obtain the identifier; and allocating the permission of accessing the first account to the second device when the first account matches the identifier.

5. The method according to claim 1, wherein the token information carries time limit information and the method further comprises:

detecting, based on the time limit information, whether the permission of accessing the first account that is obtained by the second device is within a predefined period; and suspending the permission of accessing the first account that is allocated to the second device and that corresponds to the first application when the predefined period expires.

6. The method according to claim 1, wherein the method further comprises:

receiving a retrieving request sent by the first device for the token information, the retrieving request carrying the token information;

in accordance with a determination that the token information was generated in response to the token generation request, and the token information indicates that the user of the first device has the ownership of the first account:

suspending the permission of accessing the first account that is allocated to the second device and that corresponds to the first account; and triggering the first device to switch from the state of suspending the login to the first application by using the first account to a state of recovering the login to the first application by using the first account.

7. The method according to claim 1, wherein the method further comprises:

detecting whether the second device that is in the device group and that is allocated with the permission of accessing the first account corresponding to the first account has the token information; and suspending the permission of accessing the first account that is allocated to the second device and that corresponds to the first account when the second device does not have the token information.

8. A server comprising:

one or more processors;

memory; and one or more programs stored in the memory that, when executed by the one or more processors, cause the server to perform a plurality of operations including:

receiving, from a first device, a token information request for token information corresponding to a first account registered with a first application, wherein the first application is currently logged in by the first account on the first device;

generating, based on the first account that is possessed by the user of the first device and that corresponds to the first application, the token information corresponding to the first account registered with the first application, the token information representing that the user of the first device has the ownership of the first account, wherein the token information is further encrypted with an identifier corresponding to the first account;

sending the token information to the first device, wherein the token information is further shared by the first device with one device in a device group at a time in a replication restriction manner;

receiving, from a second device, a login request to log into the first application using the first account on the second device, the login request including the token information, wherein the second device receives the token information from the first device without decrypting the token information to retrieve the identifier and a key corresponding to the first account;

performing, based on the token information, authentication on whether (1) the second device is in the device group and (2) the identifier decrypted from the token information corresponds to the first account indicated by the login request received from the second device;

granting permission to log into the first application using the first account on the second device when the authentication succeeds; and triggering the first device to switch from a state of first account-based login to the first application to a state of suspending the login to the first application by using the first account when it is determined that the second device logs in to the first application using the first account based on the permission.

9. The server according to claim 8, wherein the generating the token information corresponding to the first account comprises:

generating the identifier corresponding to the first account after receiving the token information request sent by the first device;

encrypting the identifier corresponding to the first account to obtain the token information; and maintaining a correspondence between the first account and the identifier.

10. The server according to claim 9, wherein the performing the authentication comprises:

decrypting the token information sent by the second device to obtain the identifier;

determining, based on the correspondence, that the first account corresponding to the identifier; and allocating the permission to log into the first application using the first account to the second device.

11. The server according to claim 9, wherein the performing the authentication comprises:

decrypting the token information received from the second device to obtain the identifier; and allocating the permission of accessing the first account to the second device when the first account matches the identifier.

12. The server according to claim 8, wherein the token information carries time limit information and the plurality of operations further comprise:

detecting, based on the time limit information, whether the permission of accessing the first account that is obtained by the second device is within a predefined period; and suspending the permission of accessing the first account that is allocated to the second device and that corresponds to the first application when the predefined period expires.

13. The server according to claim 8, wherein the plurality of operations further comprise:

receiving a retrieving request sent by the first device for the token information, the retrieving request carrying the token information;

in accordance with a determination that the token information was generated in response to the token generation request, and the token information indicates that the user of the first device has the ownership of the first account:

suspending the permission of accessing the first account that is allocated to the second device and that corresponds to the first account; and triggering the first device to switch from the state of suspending the login to the first application by using the first account to a state of recovering the login to the first application by using the first account.

14. The server according to claim 8, wherein the plurality of operations further comprise:

detecting whether the second device that is in the device group and that is allocated with the permission of accessing the first account corresponding to the first account has the token information; and suspending the permission of accessing the first account that is allocated to the second device and that corresponds to the first account when the second device does not have the token information.

15. A non-transitory computer readable storage medium storing one or more programs that, when executed by one or more processors of a server, cause the server to perform a plurality of operations including:

receiving, from a first device, a token information request for token information corresponding to a first account registered with a first application, wherein the first application is currently logged in by the first account on the first device;

generating, based on the first account that is possessed by the user of the first device and that corresponds to the first application, the token information corresponding to the first account registered with the first application, the token information representing that the user of the first device has the ownership of the first account, wherein the token information is further encrypted with an identifier corresponding to the first account;

sending the token information to the first device, wherein the token information is further shared by the first device with one device in a device group at a time in a replication restriction manner;

receiving, from a second device, a login request to log into the first application using the first account on the second device, the login request including the token information, wherein the second device receives the token information from the first device without decrypting the token information to retrieve the identifier and a key corresponding to the first account;

performing, based on the token information, authentication on whether (1) the second device is in the device group and (2) the identifier decrypted from the token information corresponds to the first account indicated by the login request received from the second device;

granting permission to log into the first application using the first account on the second device when the authentication succeeds; and triggering the first device to switch from a state of first account-based login to the first application to a state of suspending the login to the first application by using the first account when it is determined that the second device logs in to the first application using the first account based on the permission.

16. The non-transitory computer readable storage medium according to claim 15, wherein the generating the token information corresponding to the first account comprises:

generating the identifier corresponding to the first account after receiving the token information request sent by the first device;

encrypting the identifier corresponding to the first account to obtain the token information; and maintaining a correspondence between the first account and the identifier.

17. The non-transitory computer readable storage medium according to claim 16, wherein the performing the authentication comprises:

decrypting the token information sent by the second device to obtain the identifier;

determining, based on the correspondence, that the first account corresponding to the identifier; and allocating the permission to log into the first application using the first account to the second device.

18. The non-transitory computer readable storage medium according to claim 16, wherein the authentication comprises:
- decrypting the token information received from the second device to obtain the identifier; and
- allocating the permission of accessing the first account to the second device when the first account matches the identifier.

19. The non-transitory computer readable storage medium according to claim 15, wherein the token information carries time limit information and the plurality of operations further comprise:
- detecting, based on the time limit information, whether the permission of accessing the first account that is obtained by the second device is within a predefined period; and
- suspending the permission of accessing the first account that is allocated to the second device and that corresponds to the first application when the predefined period expires.

20. The non-transitory computer readable storage medium according to claim 15, wherein the plurality of operations further comprise:
- receiving a retrieving request sent by the first device for the token information, the retrieving request carrying the token information;
- in accordance with a determination that the token information was generated in response to the token generation request, and the token information indicates that the user of the first device has the ownership of the first account:
  - suspending the permission of accessing the first account that is allocated to the second device and that corresponds to the first account; and
  - triggering the first device to switch from the state of suspending the login to the first application by using the first account to a state of recovering the login to the first application by using the first account.

\* \* \* \* \*